Sept. 17, 1935.  H. S. LEE  2,014,941
CLOSURE APPARATUS FOR TREATMENT CHAMBERS
Original Filed Feb. 13, 1932  3 Sheets-Sheet 3
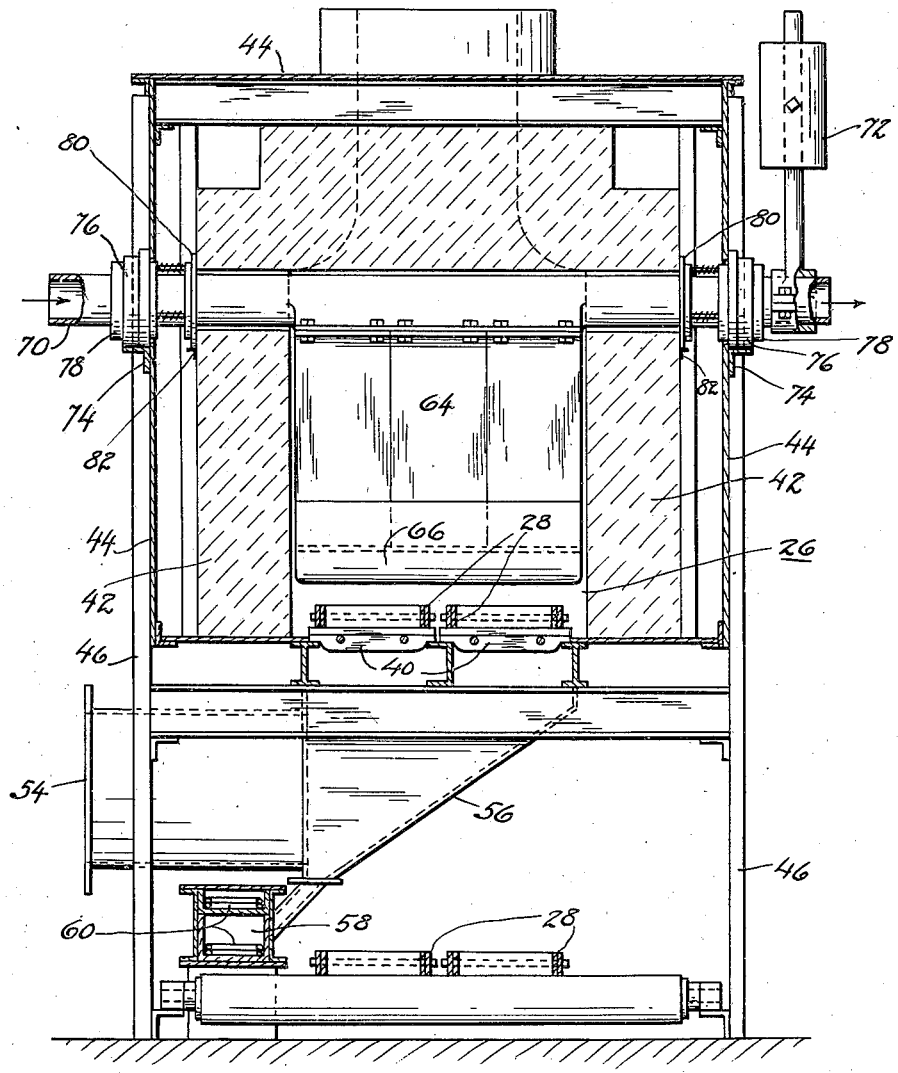
_Fig.3_
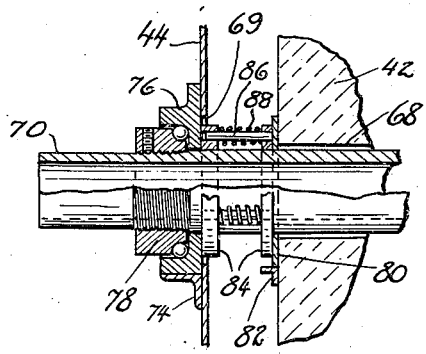
_Fig.4_
INVENTOR.
Harry S. Lee
BY
Parker & Burton
ATTORNEYS.

Patented Sept. 17, 1935

2,014,941

UNITED STATES PATENT OFFICE 2,014,941

CLOSURE APPARATUS FOR TREATMENT CHAMBERS

Harry S. Lee, Detroit, Mich.

Original application February 13, 1932, Serial No. 592,774. Divided and this application October 4, 1934, Serial No. 746,838

6 Claims. (Cl. 34—12)

My invention relates to improvements in apparatus for manufacturing, treating, and cooling cement clinker and particularly to improvements in the treatment chamber wherein the clinker is cooled following its discharge from the kiln.

This application is a division of my application Ser. No. 592,774 filed February 13, 1932. In such parent application I disclose and claim improvements in the process of and apparatus for manufacturing and treating cement clinker. The invention here claimed relates to improvements in the apparatus associated with the clinker treatment chamber and having to do with the separation of said chamber into separate compartments or zones.

One compartment is designed for the passage of air through the clinker travelling through the compartment so as to cool the clinker and heat the air. This compartment communicates with the kiln to furnish heated air to the kiln as secondary air at a predetermined high temperature to obtain the maximum efficiency of functioning within the kiln.

The other compartment is primarily a cooling compartment wherein the temperature of the clinker passing therethrough is lowered to the desired degree for discharge by passage of air through the clinker. Air is taken from this compartment for employment as primary air for the fuel feed to the kiln.

The improvements here claimed have to do with the provision of improved means separating said treatment chamber into compartments and improved mechanism associated with the cooling of said means.

Figure 1:
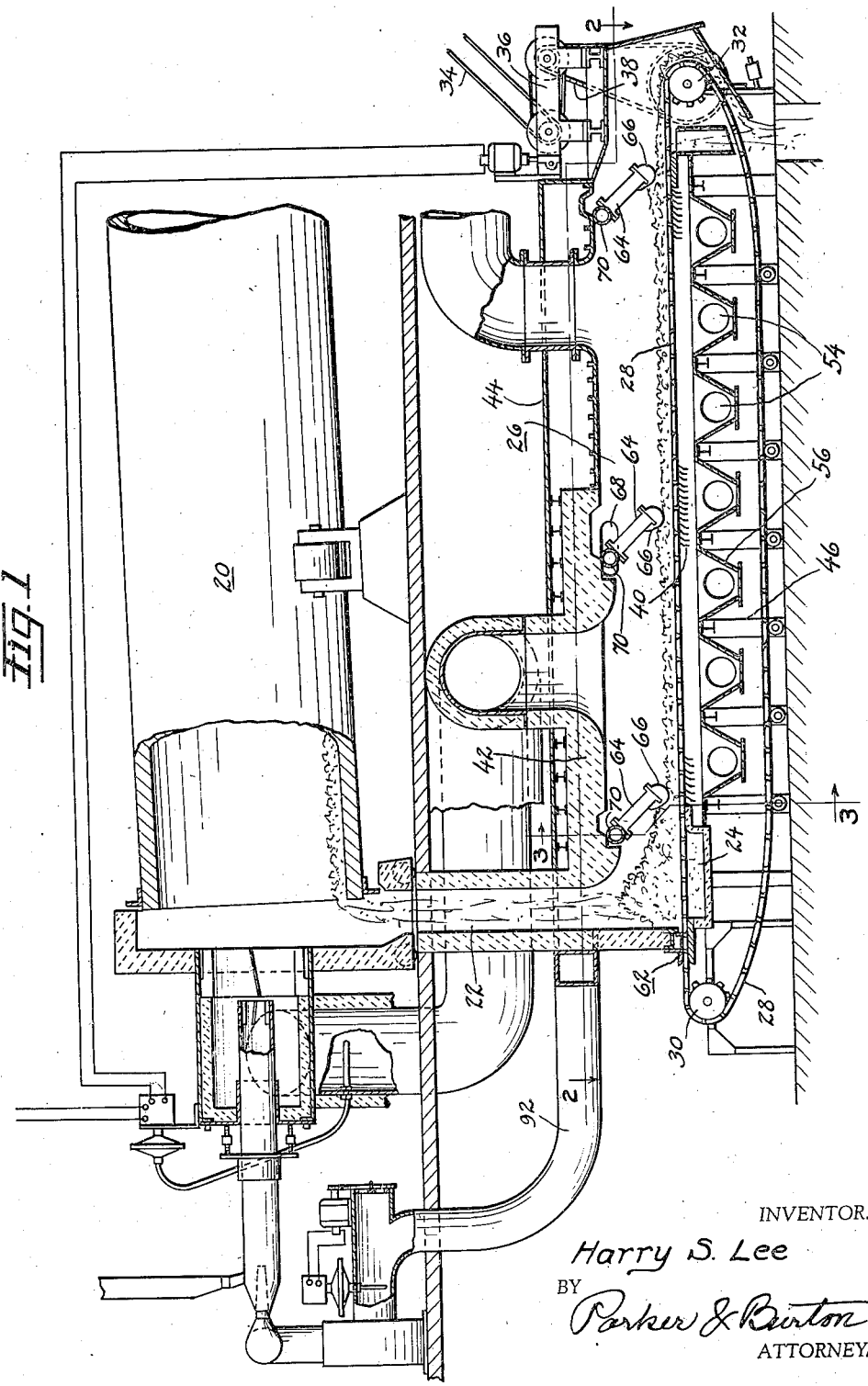
Figure 2:
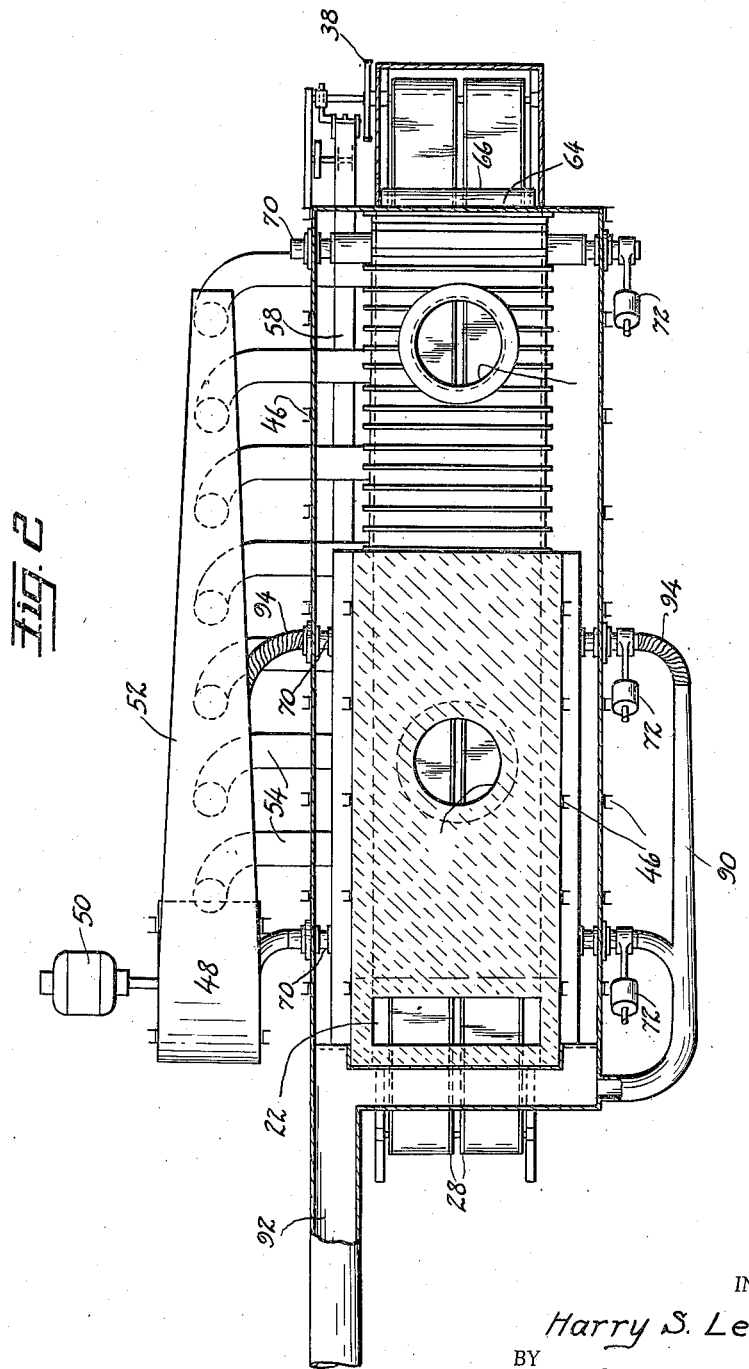

The various objects, advantages, and meritorious features of this invention will more fully appear from the following description, appended claims and accompanying drawings, wherein:

Fig. 1 is an elevation of the cement manufacturing and cooling plant wherein my invention is embodied, Fig. 2 is a cross sectional view taken on the line 2—2 of Fig. 1, Fig. 3 is an enlarged cross sectional view taken on the line 3—3 of Fig. 1 (Fig. 8, Ser. No. 592,774) and Fig. 4 (Fig. 9 of Ser. No. 592,774) is an enlarged fragmentary sectional view taken on the same line of Fig. 1 as is Fig. 3.

My invention is illustrated in apparatus of the general character shown in Fig. 1 wherein a rotary cement kiln of conventional type is indicated as 20. This kiln is adapted to discharge cement clinker from its lower end and through a vertical chute 22 into a treatment chamber indicated generally as 26. A collector pan 24 is located in one end of the treatment chamber underneath the chute 22 and the clinker falling through the chute is deposited therein. A travelling drag chain 28 is carried on sprockets 30 and 32 to pass through the chamber 26 over a stationary grate 40 which extends lengthwise of the chamber. This drag chain advances the cement clinker as a moving bed through the chamber over the grate. A belt 34 driving through a variable speed mechanism 36 drives a chain 38 which in turn drives the clinker chain 28 to advance the clinker bed.

This cooling chamber 26 is jacketed as shown in Figs. 2, 3, and 4. The inner wall 42 thereof is formed of suitable refractory material which will withstand the heat and abrasive action of the clinker at its highest temperature. The outer wall of the chamber is indicated as 44. The entire chamber structure is supported upon suitable standards or legs 46.

A suitable blower 48 (Fig. 2) driven by a control variable speed electric motor 50 feeds air into a manifold 52. This manifold is provided with a series of air outlet pipes 54 through which air is discharged into the chamber below the grate so that it enters underneath the grate at spaced apart intervals therealong and moves upwardly through the grate and over the cement clinker being advanced thereover by the drag chain.

There is a sloping wall 56 underneath the grate which leads to a trough 58 that extends lengthwise of the chamber 26 and into which the fine particles of cement clinker or dust fall as the clinker is being advanced. This trough is provided with its own conveyor 60 which structure is described in the parent application Ser. No. 592,774 and forms no part of the instant application.

The conveyor 28 enters the chamber 26 at the forward end through suitable sealing mechanism indicated generally as 62 but described more particularly in my Patent No. 1,941,560 wherein claim is made thereto.

Air enters the chamber through the plurality of pipes 58 from the manifold and goes up through the grate and over the cement clinker being advanced thereover and is segregated so that a selected portion of the hottest air is taken into the kiln as secondary air to obtain the maximum efficiency of functioning within the kiln. This air is taken into the kiln at a predetermined temperature which is suited for the needs of combustion as described in my parent application Ser. No. 592,774 supra.

The chamber is divided into a plurality of compartments by a series of swingable gates or valve like levelling members indicated generally as 64. Three of these are here shown. One of these gates is shown in detail in Fig. 3. Air is taken from these separate compartments at certain predetermined temperatures bearing a certain relationship to each other for different purposes as more clearly set forth in my parent application Ser. No. 592,774.

This application pertains primarily to the mounting and sealing of these gates within the jacketed chamber and the provision of the chamber with the plurality of gates arranged therein as defined. Each of the gates is hollow and carried by a hollow shaft which is provided with improved sealing means where it is mounted within the chamber walls. These hollow shafts communicate with the manifold to receive air therefrom to cool the gates. These gates are provided with removable wearing shoes 66 and a specific interior construction which features are disclosed and claimed in my Patent No. 1,941,561.

The gates serve other purposes than merely to divide the interior of the chamber into separate compartments for the segregation of air passed over the clinker for they also serve as levelling means to level off the clinker bed, and the first gate provides a barrier to prevent air flowing directly up through the clinker chute into the kiln. As shown in Figs. 3 and 4 there is a seal provided about each of the rotatable shafts about which a gate is mounted. The intermediate gate is adjustable longitudinally in slot 68 to vary the size of the compartments formed thereby in the cooling chamber and this seal is so constructed as to maintain a seal while permitting such adjustment.

Each shaft 70 which carries a gate 64 extends through the jacketed wall of the chamber and is provided on one end with a counterweight 72 which holds the gate down upon the clinker bed. Where the shaft extends through the chamber wall the seal is provided. Shaft 70 is shown as having a suitable bearing support in the outer wall 44. This support is shown more clearly in Figs. 3 and 4. There is a bracket 74 and a plate or casting 76 which in the case of the intermediate adjustable gate is of sufficient length to cover at any adjusted position the slot 69 formed in the outer wall. The bearing proper is indicated as 78. The slot 68 in the inner wall is covered by the plate 80 through which the shaft extends. This plate 80 is supported upon a bracket 82.

Spaced apart collars 84 encircle the shaft and are held in spaced apart relationship by studs 86 and expansion springs 88 which urge the collars against the side walls of the chamber and hold the plate 80 against the inner wall 42 so as to prevent leakage at such point notwithstanding the adjustment of the intermediate gate. The non-adjustable gate has a corresponding mounting and collar as described but the mounting does not have to provide for covering slots through the side walls as these are not there needed.

Air passes from the manifold 52 to the shafts 70 of the two forward gates and out into an exhaust manifold 90 which communicates with the passageway 92 shown in Fig. 2. Flexible conduits 94 are provided for conducting air to and from the shaft 70 of the intermediate gate so as to permit of adjustment of this intermediate gate lengthwise of the chamber.

During the operation of the machine air is passed from the manifold 52 through the swingably supportable gates and the shafts upon which they are mounted and maintains the gates at a sufficiently cool temperature so that they are not rapidly worn away by the abrasive action and the heat within the cooling clinker chamber as such heat approaches very high limits. As the clinker is conveyed through the chambers it continues to cool and it is apparent that the air passed through the clinker in its earlier stages of advancement is hotter than that passed through in its later stages. By adjusting the intermediate gate longitudinally of the conveyor, it is readily apparent that the temperature as well as the amount of air collected in the various stages of clinker advancement can be varied.

What I claim is:

1. The combination in a jacketed chamber through which heated material is adapted to be passed of valve mechanism suspended within the chamber for swinging movement, said valve mechanism comprising a hollow shaft extending through the jacketed walls of said chamber and a hollow valve flap carried by said shaft and communicating therewith, closure means encircling the shaft adjacent the inner wall of the chamber, and spring means arranged between said walls holding said closure means against said inner wall.

2. The combination in a jacketed chamber through which heated material is adapted to be advanced of means for advancing heated material therethrough, valve means supported within said chamber to engage the heated material and advance therethrough and comprising a hollow shaft extending through the jacketed walls of said chamber, means communicating with the ends of said hollow shaft to cause cooling fluid to flow therethrough, a closure plate enclosing said shaft between the jacketed walls of said chamber and bearing against the outer surface of the innermost wall, and means yieldably urging said closure plate against said wall.

3. The combination in a jacketed chamber through which heated material is adapted to be advanced of means for advancing heated material therethrough, valve means supported within said chamber to engage the heated material being advanced therethrough comprising a hollow shaft extending through the jacketed walls of said chamber, means communicating with the ends of said hollow shaft to cause cooling fluid to flow therethrough, a pair of closure plates encircling said shaft between the jacketed walls of said chamber, and means holding said closure plates against said walls about said shaft.

4. The combination in a jacketed chamber through which heated material is advanced, of a valve pivotally supported within said chamber and comprising a shaft journalled within the walls of said chamber and extending therethrough, a closure plate encircling said shaft at each end between the jacketed walls of the chamber and bearing against one of them sealing the shaft bearing opening.

5. In a chamber through which heater material is adapted to be advanced, a gate pivotally supported in said chamber by means of a shaft extending between opposite walls of the chamber, said chamber walls provided with a slot at each of the pivotal connections of the shaft with the walls so as to permit adjustment of the gate with respect to the chamber, a plate mounted about each end of said shaft having a size sufficient to cover the slot at any position to which the gate may be adjusted, and spring means carried by said shaft for resiliently urging said plates against the walls of said chamber to prevent the escape of heat from the interior of the chamber through the slots.

6. The combination in a jacketed chamber through which heated material is adapted to be advanced, of a valve pivotally supported within the chamber upon a shaft extending transversely therethrough and through the jacketed walls of the chamber, a bearing for each end of the shaft adjacent each outer jacketed wall of the chamber and supported for slidable movement lengthwise of the chamber to permit adjustment of the valve within the chamber lengthwise of the chamber, said outer wall of the chamber provided with a shaft opening oversize the shaft to permit of adjustment of the shaft longitudinally of the chamber, said bearing having a part associated therewith adapted to cover the shaft opening through the outer wall of the chamber at any adjusted position of the shaft, said inner walls of the chamber provided with a shaft opening oversize the shaft to accommodate for adjustment of the shaft longitudinally of the chamber, a closure plate for each end of the shaft encircling the shaft and arranged between the two walls of the chamber, means holding said closure plate to cover the shaft opening through the inner wall of the chamber at any position of adjustment of the shaft longitudinally of the chamber.

HARRY S. LEE.